Feb. 16, 1954     I. V. BRUMBAUGH     2,669,418
VALVE
Filed July 28, 1948     2 Sheets-Sheet 1
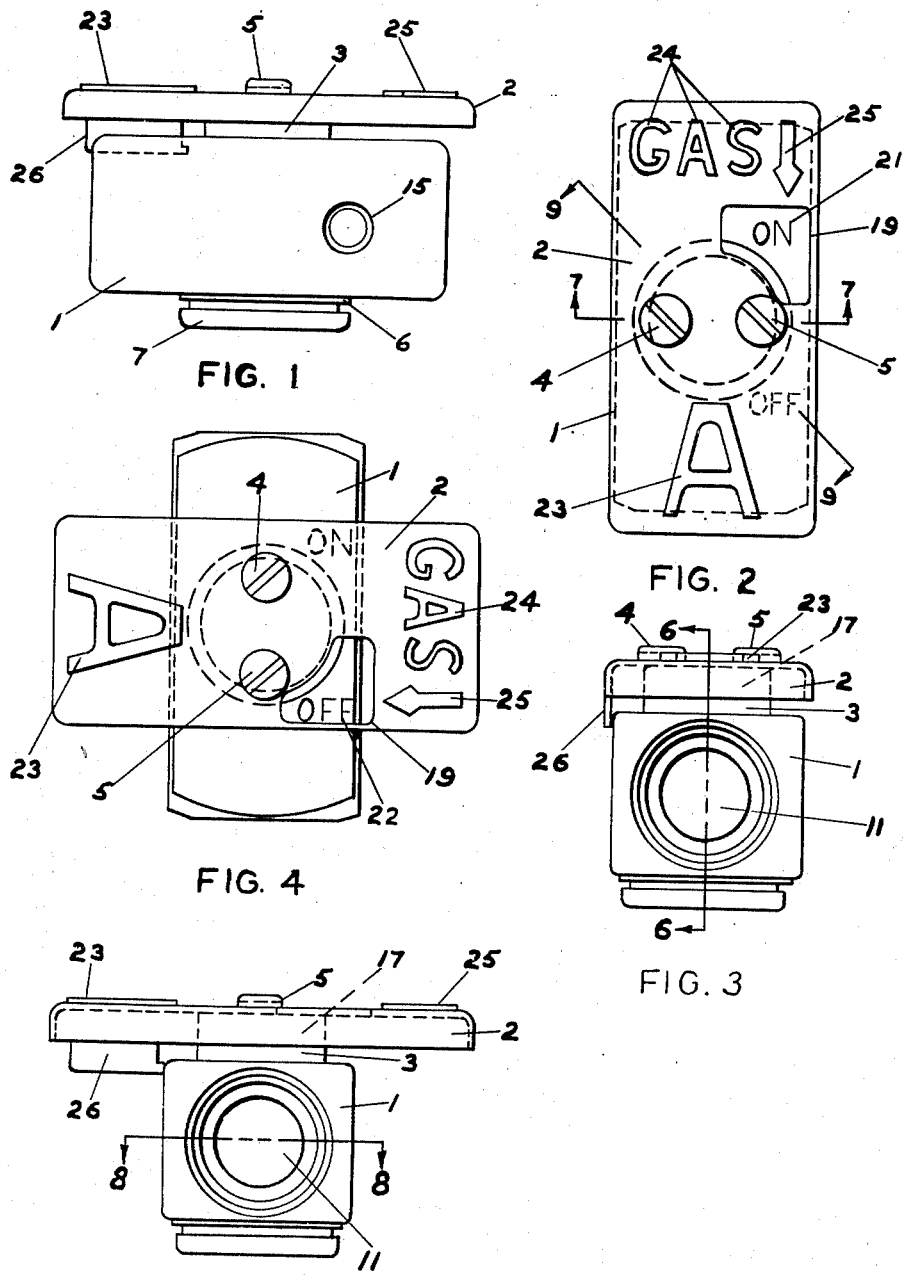
INVENTOR.
ISAAC VERNON BRUMBAUGH
BY
Jerome R. Cox Feb. 16, 1954     I. V. BRUMBAUGH     2,669,418
VALVE Filed July 28, 1948     2 Sheets-Sheet 2

*INVENTOR.*
ISAAC VERNON BRUMBAUGH
BY
*Jerome R. Cox*

Patented Feb. 16, 1954

2,669,418

UNITED STATES PATENT OFFICE 2,669,418

VALVE

Isaac Vernon Brumbaugh, Clayton, Mo.

Application July 28, 1948, Serial No. 41,099

6 Claims. (Cl. 251—112)

The invention disclosed in this application relates to valves. It is illustrated as a valve particularly adapted for use as a manual main gas control valve for the control of gas heating appliances. It is customary to call such valves "A" valves. For this reason the letter "A" is formed or otherwise added to the handle. However, it is to be understood that features of the invention are useful in other types of gas control valves and in fact in all other types of valves. Prior to my invention, valves of this type have usually been made from castings. As is well known, castings are relatively weak. As a consequence such valves require a great deal of metal in order to insure safety and therefore are relatively heavy.

I propose to make the bodies of my valves from bars of trapezoidal or rectangular shape which may for example be of extruded metal. The bodies may be machined either from a solid bar or from a bar initially formed with a hole extending lengthwise through it, the hole serving to form the passageway for gas through the body of the valve. The trapezoidal shape of the bar controls the shape of the finished valve and thus provides flat surfaces (for purposes later to be emphasized) and at the same time saves a large amount of material.

By "trapezoidal" bars (or body) as used in this specification and claims, I mean bars (or a body) having a cross section normal to the length of the bar (or body) which is a trapezoid in shape (i. e. a figure with four sides, having two sides parallel to each other). This is the dictionary sense of the word and the word is so defined for use herein. In this definition it is clear that a rectangular bar (or body) is trapezoidal inasmuch as a rectangle is a specific form of a trapezoid.

One of the important objects of my invention is the provision of a valve which is of pleasing appearance, (streamlined) easy to turn, relatively light in weight, of low cost, efficient in operation, of relatively high strength, and compact in size and construction.

A further important object of my invention is the saving of material and space by making a valve having a body of minimum length, width and thickness.

A further important object of the invention is the provision in such a valve of adequate bearing surfaces both at the large and small end of the plug and of an adequate circumferential seal while using only a minimum of material.

A further object of my invention is the provision of a valve formed with a pair of parallel flat faces and having a flat handle laying over and parallel to one face, cooperating therewith and secured to the larger end of a taperd plug for the valve, the smaller end of the tapered plug protruding through the other flat face.

A further object of the invention is the provision in combination with such a flat faced valve body of a stamped or formed handle for the plug, having an overhanging stop which positions the plug accurately in the off and on position by contacts with one of the sides of the body.

A further object of the invention is the provision of a valve body having a tapered bore and having in said bore a tapered plug having its larger end extending into the tapered bore at least as far as the larger end of the bore in the body and its small end extending out of the bore of the body at least as far as the smaller end of the bore of the plug whereby shouldering of the plug in the bore is prevented.

A further object of the invention is the provision, in combination with a tapered plug valve in which the smaller end of the plug extends out of the tapered bore, of an insert extending into a recess in the small end of the plug and bearing on the cooperating end of the body so as to bridge the bearing surface adjacent to the junction between the small end of the plug and the body.

A further object of my invention is the provision of a valve having a body and a plug and having a handle which is of entirely new design and of pleasing appearance and which is separate from but secured to the plug.

A further object of my invention is the provision of an improved process or method of manufacturing valves of this type.

A feature of the invention is the provision of an inlet opening leading into the main gas passage which inlet opening extends through the body of such a valve at a bevelled or tapered portion of the gas passage bore thus allowing for the passage of gas to a pilot burner.

A further feature of the invention is the provision of a plurality of grease reservoirs for the adequate life-time lubrication of the valve.

A further feature of the invention is the utilization of a bridging member bridging the outwardly extending smaller end of the plug to support a spring for holding the plug in gas-tight relationship.

A further feature is the provision of vent openings in such a bridging member to facilitate testing.

A further feature of the invention is the provision of a wrench grip separated from the main portion of the body of the plug which may be (if desired) of different size or shape from the size and/or shape of the main portion of the body.

A further feature of my invention is the provision in such a valve of markings on one of the flat or horizontal planes or surfaces of the body to indicate the "on" and "off" positions.

A further feature of my invention is the extension of the bearing surface between the plug and the body at the larger end of the bore to a point adjacent to one flat face of the body, and completely to the other flat face of the body at the smaller end of the bore.

A further feature of my invention is the design of the operating portions of a preferred valve of which the ends may be formed so as to be used with end fittings of various sizes and of both male and female design.

A further feature of my invention is the provision of a valve made from trapezoidal (including rectangular) stock in which the distance through the valve body along the axis of rotation of the plug is shorter than the length of the body along the axis of the gas passageway, and is also shorter than the width of the body perpendicular to the axis of the gas passageway, and perpendicular to the axis of rotation of the plug.

I have designed a valve of the type in which a tapered plug turns in a tapered bore, which valve is of minimum size at the same time that it is efficient in operation and high in strength, and has easy turning qualities and pleasing appearance. By reason of the small size the valve is of light weight, is low in cost and is compact so as to allow easy installation. It saves material in its construction by reason of its small size. The minimum length of a valve of this type is determined by (1) the diameter of the plug, (2) the distance required for tapping so that end connections such as pipes may be secured to the valve, (3) the distance required for other connections such as for example a connection for a pilot valve line along the length of the valve and (4) the distance required for an adequate circumferential bearing and seal. The minimum depth of the body must be such as to provide for an adequate sized bore through the plug and body and provide for adequate bearing surfaces at the large and at the small end of the plug, extending beyond said bore so as to seal longitudinally of the plug. The minimum width of the body must be such as to accommodate the plug and to provide an adequate circumferential seal. Beyond these minimum requirements any additional metal used in the body of a valve is unnecessary and therefore expensive and is also undesirable in that thereby the valve becomes more bulky and difficult to install in smaller places. My valve therefore has been designed to eliminate so far as practical unnecessary length, depth and width and thus eliminate all unnecessary materials. I start out with three dimensions that may be considered fixed. The first fixed dimension is the size of a bore in the body large enough to accommodate the end fittings therefor if the end fittings are male; or of the outside dimension large enough to be screwed into the end fittings if the fittings are female. The second fixed dimension is the size of a bore in the plug required to allow the passage of the amount of gas for which such a valve is designed. The third fixed dimension is the length of the tapping necessary to insure a secure fastening of the end fittings. With these requirements in mind I have discovered that a valve body of trapezoidal or rectangular shape is substantially the optimum shape for saving material and labor. Such a body provides at the same time a pleasing appearance, easy turning qualities, efficient sealing, light weight, low cost, high strength and compact size. In most cases a rectangular shape seems to work out best, although in some cases the sides of the valve need not be parallel provided that the top and bottom surfaces (considering that the plug extends from top to bottom of the valve) are substantially flat and parallel. In the valves which I have fabricated the rectangular shapes have been most desirable.

Further features and objects of the invention will be apparent from the following specification and claims when considered in connection with the accompanying drawings illustrating several embodiments of my invention.

In the drawings:

Fig. 1 is a view in side elevation showing a valve constructed according to my invention;

Fig. 2 is a view in plan of the valve shown in Fig. 1;

Fig. 3 is a view in end elevation of the valve illustrated in Figs. 1 and 2;

Fig. 4 is a view in top plan of the valve of Figs. 1–3 inclusive with the handle turned so that the valve is in the "off" position;

Fig. 5 is a view of the same valve in end elevation with the handle turned so that the valve is in the "off" position;

Figure 6:
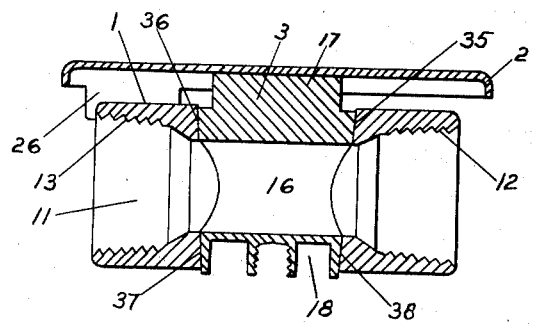
Fig. 6 is a view in vertical section taken substantially on the line 6—6 of Fig. 3.
Figure 7:
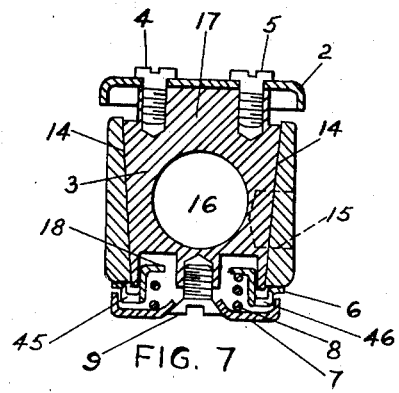
Fig. 7 is a view in vertical section taken substantially on the line 7—7 of Fig. 2.

Referring now to the drawings and especially to Figs. 1 to 11 inclusive it may be seen that I have shown as one illustration of my invention, a valve comprising nine parts. These parts comprise a body 1 which as stated above, is formed from bar stock; a stamped metal handle 2; a plug 3, secured to the handle by screws 4 and 5; a bridging member 6; a spring washer 7; a spring 8; and another screw 9 by which the spring support washer 7 is secured to the plug 3. The body 1 is, as shown most clearly in Fig. 6 formed with a gas passageway 11, which is tapped as at 12 and 13 and is also formed with a tapered plug bore 14 into which the plug 3 is seated. The body is also formed (as may be seen most clearly in Figs. 7 and 8) with a "B" valve (pilot burner valve) inlet 15. The axis of this bore is slightly below the axis of the gas passageway 11, but if desired it may be exactly on the gas passageway axis or it may be considerably below that axis. The plug 3, is formed with a gas passageway 16, with an upper central boss 17 and adjacent to its lower end is formed with an annular recess 18. It is tapped for the reception of screws 4 and 5 at its upper end in the boss 17 and at its smaller end, concentrically with the annular recess 18, is tapped for the reception of the screw 9. It is to be especially noted that the edge of the bearing surface at the upper end of the plug is within the bore 14. Thus the bearing surface of the plug 3 will not shoulder from its contact with the upper edge of the bore in the body 1. It is also noted that the bearing surface of the plug at its smaller end extends out of the bore 14 so that the lower end of the bore will not be shouldered by the edge of the plug.

The bridging member 6 bears on the lower side of the body member adjacent to and surrounding the smaller end of the plug receiving bore, bridges the smaller annular end of the plug and extends into the recess 18. The washer 7 is secured by the screw 9 in the concentric tapped bore in the smaller end of the plug 3. Interposed between the washer 7 and the bridging member 6 is the compression spring 8. Thus the bridging member 6, the spring 8, the washer 7, and the screw 9 operate to urge the plug at all times to a sealing seat within the tapered bore 14.

The stamped handle 2 is provided with a recess or cut out portion 19 which in the "on" position of the valve exposes to view the marking "on" 21 and in the "off" position of the valve exposes to view the indication "off" 22. The stamped handle is provided with raised portions 23 showing the letter "A," 24 showing the word "gas," and 25 comprising an arrow which points to the indication "on" or "off" as the case may be. As stated above the handle 2 is secured to the large end of the plug by means of the screws 4 and 5. The handle is provided with a turned down extension or projection 26 which contacts with the side of the body member 1 as shown in Fig. 3 to determine the "on" position and also with the same side as shown in Fig. 5 to determine the "off" position.

It is to be especially noted that the top face of the body member is substantially flat as is also the bottom face of the body member and that these two faces are substantially parallel to each other. The side faces of the body member in this embodiment of my invention are also substantially flat and are also parallel to each other, forming right angles with the top and bottom faces. By reference to Fig. 8 it can readily be seen that when the plug member 3 is rotated ninety degrees (that is, when the handle is rotated from the position shown in Fig. 2 to that shown in Fig. 4) the bore 16 is turned out of alignment with the passageway 11 so that gas may not flow through the valve, being prevented by the solid portions of the plug valve. However, when the valve is turned from the position shown in Fig. 8 to that of Figs. 1, 2, 3, 6 and 7, gas may flow freely through the passage 11. In this connection attention is directed to the adequate circumferential seal formed by the portions of the valve and body indicated at points 31, 32, 33, and 34. Also by reference to Fig. 6 it may be seen that the larger part of the plug has a bearing face as at 35 and 36 on the tapered bore and the smaller end of the plug has a bearing face as at 37 and 38 on the smaller part of the tapered bore. These bearing surfaces are of adequate length and area to prevent the escape of gas along the plug. In this connection it should be noted that the spring 8 is effective at all times to maintain the plug in sealing contact. As the plug and the tapered bore wear, the plug continues to seat itself. Due to the fact that the larger end of the plug is below the edge of the tapered bore and the smaller end of the plug is outside of the tapered bore there is no possibility of either the plug or the bore shouldering (i. e. wearing a groove and forming a stop which might cause a leak).

It is to be understood that the tapping 13 is on the outlet side of the valve and the tapping 12 is on the inlet side of the valve. The bore 15 is on the inlet side of the valve so that a pilot flow of gas may flow from the gas inlet to the pilot burner.

Figure 9:
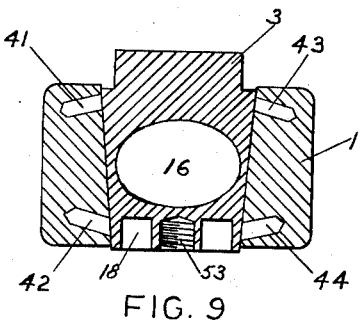
Fig. 9 is a view in vertical section taken substantially on the line 9—9 of Fig. 2.
Figure 10:
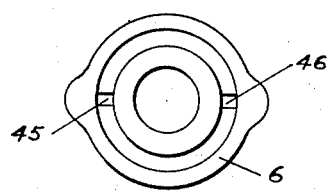
Fig. 10 is a view in plan of a bridging washer forming a part of the valve.
Figure 11:
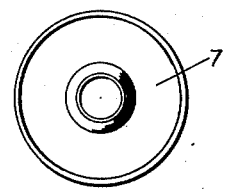
Fig. 11 is a view in plan of a spring washer forming a part of the valve.

Referring now to Fig. 9 it may be seen that the body 1 is formed with a plurality of lubrication pockets such as 41, 42, 43 and 44 whereby a lifetime supply of lubricant is provided so that lubricant may be available for the valve at all times. It may be noted also that the bridging member 6 is formed with vents 45 and 46 which may be used for testing purposes as will be later described.

Figure 12:
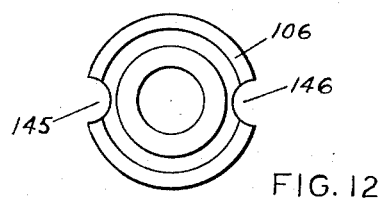
Fig. 12 is a view in plan of an alternative form of bridging washer which may be used in place of the washer shown in Fig. 10 if desired.

As shown in Fig. 12 an alternative form of bridging member 106 may be used instead of the bridging member 6, such bridging member 106 being formed with vent openings 145 and 146.

Process

The bodies and plugs of my manual main control valves are preferably machined from "bar stock." For example a bar stock of rectangular shape may have an outside dimension corresponding substantially to the dimensions of the valve body. The outside dimensions usually are preferably of rectangular shape although other trapezoidal shapes are in some instances usable and possibly more advantageous. If the body is machined from a tubular bar, the size of the opening extending through the tubular bar should conform substantially to the size of the gas passageway. The tubular bar is then cut into lengths conforming to the length of the valves to be formed. The ends are threaded. A tapered bore is formed perpendicular to the passageway at an intermediate portion of the body so as to intersect the passageway. Then an appropriately formed tapered plug is inserted in the tapered bore.

I prefer that the bar from which the bodies are made be solid and the gas passageway be bored lengthwise of the body, after or at about the same time that the body is cut from the bar.

Operation

The operation of the embodiments of my invention illustrated are believed to be fairly obvious from the above description. In the embodiment illustrated in Figs. 1 to 11 inclusive, the parts 1 to 9 inclusive are assembled by inserting the plug 3 into the bore 14; inserting the bridging member 6 in the recess 18 so that it bears upon the bottom face of the body 1; positioning the spring 8 on the inner annular ledge of the bridging member 6; adding the washer 7; and inserting the screw 9 in the central bore 53. The handle 2, is secured to the boss 17 of the plug 3 by the screws 4 and 5.

Figure 8:
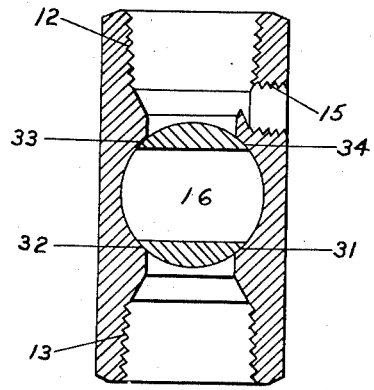
Fig. 8 is a view in horizontal section taken substantially on the line 8—8 of Fig. 5.

When the plug is turned by means of the handle 2 to the position shown in Figs. 4, 5 and 8 no gas may flow through the valve. However, when the handle is turned to the position shown in Figs. 1, 2, 3, 6 and 7 the plug is accordingly turned so that gas may flow freely through the gas passageway 11 and the plug bore 16 flowing from the inlet end which is indicated by the threaded portion 12 to the outlet end indicated by the threaded portion 13. At all times a small supply of gas may flow from the inlet end of the valve through the bore 15 to a pilot valve.

In testing the valve, leaks may be easily discovered because gas cannot be trapped under the bridging member 6 but can freely escape through the vent openings 45 and 46. The indicia 24 shows to any persons (however unfamiliar with the valve) that it is a gas valve and the arrow 25 cooperates with the window 19 and the indicia 21 and 22 to show to any operator whether the valve is on or off. The indicia 23 tells the type of gas valve to any person familiar with the gas valve art.

The stop projection 26 prevents the valve from being turned beyond either position. As shown in Fig. 3, it contacts with one side of the body 1 to maintain the "on" position and as shown in Fig. 5 it also contacts with the same side of the valve body to show and to maintain the "off" position.

It is to be understood that the above described embodiments of my invention are for the purpose of illustration only, and various changes may be made therein without departing from the spirit and scope of the invention.

I claim:

1. A valve comprising a body having a gas passageway and a tapered plug bore intersecting said passageway; a tapered plug in said bore having a sealing contact with said bore throughout substantially the entire length of said plug bore, having at its smaller end a central hole and having an annular channel spaced from and surrounding said hole and extending into said plug farther than the lower end of said plug bore; means secured to said plug at said hole for forming an outer spring abutment; a bridging element consisting of a bridging member having an inner abutment portion extending into said channel and forming an inner spring abutment, having an intermediate portion bridging the edge of the smaller end of the plug, and having an outer bearing portion bearing on the portion of the body surrounding said smaller end of the plug; and a spring interposed between said outer spring abutment means and said inner abutment portion of said bridging element for maintaining said plug in sealing contact in said bore.

2. A valve comprising a body having a gas passageway and a tapered plug bore intersecting said passageway; a tapered plug in said bore having at its smaller end a central hole and having an annular channel spaced from and surrounding said hole; means secured to said plug at said hole for forming an outer spring abutment; a bridging element consisting of a bridging member having an intermediate annular channel portion bridging the rim of the smaller end of the plug and formed with vent openings, having an inner annular flat portion extending into said channel of the plug and forming an inner spring abutment, and having an outer annular flat portion bearing on the portion of the body surrounding the smaller end of the plug; and a spring interposed between said outer spring abutment means and said inner annular flat portion of said bridging element for maintaining said plug in sealing contact in said bore.

3. A valve comprising a body provided with a plurality of substantially flat faces, two of which are substantially parallel; provided with a tapered bore forming a plug opening and extending through the body substantially perpendicular to said parallel faces, and having a gas passage extending through said body intersecting said plug opening; tapered plug positioned in the bore and having an annular recess in its small end; a spring operatively connected to said plug for resiliently urging said plug to a seating engagement within said plug opening; a bridging element bearing on one of said parallel faces, positioned partly within said annular recess, and forming a body abutment for the inner end of said spring; a washer forming an abutment for the outer end of said spring and formed with a central tapered counter-sunk opening; and a screw secured to said plug and seated in said counter-sunk opening with the outer face of the screw depressed within said counter-sunk opening.

4. A valve comprising a body having a gas passageway and a tapered plug bore intersecting said passageway; a tapered plug in said bore having its smaller end extending through said bore and beyond the end thereof and having at its smaller end a central hole and an annular channel recessed in said smaller end, said channel being spaced from and surrounding said central hole, extending into said plug farther than the smaller end of said plug bore, and being spaced from the periphery so as to form a peripheral rim; means secured to said plug at said hole for forming an outer abutment; a bridging member consisting of a washer having an outer annular flat portion bearing on the body, an intermediate annular channel portion bridging the portion of the peripheral rim of the smaller end of the plug which extends beyond the plug bore in the body, and an inner annular flat portion extending partially into the channel of the plug and forming an inner abutment; and a spring interposed between said outer abutment and said inner abutment for maintaining said plug in sealing contact in said plug bore.

5. A valve comprising a body having a substantially flat, substantially rectangular face and a substantially flat side, having a gas passage bore extending lengthwise of the body, and having a tapered plug opening interconnecting said passage bore with its axis perpendicular to the plane of said face and perpendicular to said bore; a rotatable tapered plug within said opening having a passage adapted on rotation of the plug to open or close communication between the ends of the gas passage bore; and a handle connected to said plug consisting of a relatively thin metal member with turned down formed edges for reinforcement and having a substantially flat surface having a dimension, position, and shape substantially conforming, when said handle is in the open position of the valve, to the dimension, position, and shape of said flat face of the valve, and said handle having a projection extending from one of said formed edges which is substantially parallel to and contacts with said flat side when the valve is in open position and which is perpendicular to and contacts with said flat side when the valve is in closed position, whereby said projection of the turned down formed edge limits the movement of the plug to prevent rotation in either direction beyond said open and closed positions and positions the valve accurately in said open and closed positions.

6. A valve comprising a body formed substantially as a rectangular prism, having substantially flat top and bottom sides and end faces, having a length greater than either its width or its depth, having a gas passage bore extending lengthwise of the body, and having a tapered plug opening interconnecting said passage bore extending through said body with its axis substantially perpendicular to the plane of said top face and perpendicular to the axis of said gas passage bore; a plug within said opening having a passage adapted on rotation of the plug to open or close communication between the ends of the gas passage bore; a handle secured to the plug and consisting of a substantially flat oblong and relatively thin sheet metal member formed with turned down edges perpendicular to the surface of said member; a portion of one edge extending beyond the other portions to form an extension and so positioned that when the valve is open, said extending portion comes into contact with a side of said body, and when the valve is turned to closed position it contacts with the same side of the body at a different point whereby said extension forms a stop limiting the movement of said plug to prevent rotation in either direction beyond said open and closed position and to position said valve accurately at said open and closed positions.

ISAAC VERNON BRUMBAUGH.

References Cited in the file of this patent

UNITED STATES PATENTS

| Number | Name | Date |
|---|---|---|
| 454,234 | Stafford | June 16, 1891 |
| 495,739 | Kennedy | Apr. 18, 1893 |
| 871,956 | Rice | Nov. 26, 1907 |
| 930,017 | Yankauer | Aug. 3, 1909 |
| 951,378 | Neal | Mar. 8, 1910 |
| 1,103,137 | Furber | July 14, 1914 |
| 1,161,940 | Lewis et al. | Nov. 30, 1915 |
| 1,183,012 | Kunzer | May 16, 1916 |
| 1,227,574 | Bolt | May 29, 1917 |
| 1,261,469 | Bache | Apr. 2, 1918 |
| 1,288,486 | Blackmore | Dec. 24, 1918 |
| 1,343,530 | Tallman | June 15, 1920 |
| 1,357,608 | Blackmore | Nov. 2, 1920 |
| 1,367,605 | Kellum | Feb. 8, 1921 |
| 1,513,028 | Bissell | Oct. 28, 1924 |
| 1,816,012 | Heins | July 28, 1931 |
| 1,844,551 | Anderson | Feb. 9, 1932 |
| 1,855,586 | Nordstrom | Apr. 26, 1932 |
| 1,964,045 | Fausek | June 26, 1934 |
| 2,011,063 | Masoner | Aug. 13, 1935 |
| 2,309,666 | Parker | Feb. 2, 1943 |
| 2,446,496 | Tautz | Aug. 3, 1948 |
| 2,499,739 | Forbes | Mar. 7, 1950 |

FOREIGN PATENTS

| Number | Country | Date |
|---|---|---|
| 1,413 | Denmark | of 1902 |
| 759,612 | France | of 1934 |